(12) United States Patent
Gscheidle et al.

(10) Patent No.: US 7,960,861 B2
(45) Date of Patent: Jun. 14, 2011

(54) REDUNDANT CURRENT SUPPLY WITH DIAGNOSTIC CAPABILITY AND A SUPPRESSOR

(75) Inventors: Wolfgang Gscheidle, Oberstenfeld (DE); Michael Rimpel, Schwieberdingen (DE); Klaus Haefele, Burgstetten (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/394,611

(22) Filed: Feb. 27, 2009

(65) Prior Publication Data
US 2009/0322156 A1    Dec. 31, 2009

Related U.S. Application Data

(63) Continuation of application No. PCT/EP2007/007445, filed on Aug. 24, 2007.

(30) Foreign Application Priority Data

Aug. 31, 2006 (DE) .......................... 10 2006 040 753

(51) Int. Cl.
*H02J 1/10*    (2006.01)
(52) U.S. Cl. ................ 307/52; 307/43; 307/51; 307/84; 307/85
(58) Field of Classification Search ............. 307/43, 307/51–52, 64–66, 84–85
See application file for complete search history.

(56) References Cited

U.S. PATENT DOCUMENTS

| | | | | |
|---|---|---|---|---|
| 3,912,940 A | * | 10/1975 | Vince | 307/64 |
| 4,812,672 A | * | 3/1989 | Cowan et al. | 307/64 |
| 5,598,041 A | * | 1/1997 | Willis | 307/43 |

(Continued)

FOREIGN PATENT DOCUMENTS
DE    197 57 113 A1    7/1999
(Continued)

OTHER PUBLICATIONS

International Search Report dated Mar. 26, 2008 (Three (3) pages).
(Continued)

*Primary Examiner* — Jared J Fureman
*Assistant Examiner* — Adi Amrany
(74) *Attorney, Agent, or Firm* — Crowell & Moring LLP

(57) ABSTRACT

A circuit arrangement and method for redundantly supplying current to a downstream load are provided. The circuit arrangement includes a first current path including a first switch element to which a first voltage is applied on the input side, a second current path including a second switch element to which a second input voltage is applied on the input side, a first control device which is connected to the first current path and used to control the first switch element, a second control device which is connected to the second current path and used to control the second switch element, and a common output terminal of the first and second current paths, from which a load supply voltage is emitted. In a normal operating state, the first control device holds the first switch element in a let-through state and the second control device holds the second switch element in a let-through state, and in an abnormal operating state, depending on electrical properties of the first current path or the second current path, the control device which is located in the current path having weaker electrical properties transfers the switch element in the current path into a blocking state.

14 Claims, 2 Drawing Sheets

U.S. PATENT DOCUMENTS

| | | | | |
|---|---|---|---|---|
| 5,672,958 | A | * | 9/1997 | Brown et al. .................. 323/269 |
| 5,796,274 | A | * | 8/1998 | Willis et al. ...................... 327/63 |
| 5,867,007 | A | * | 2/1999 | Kim .............................. 320/118 |
| 5,945,816 | A | * | 8/1999 | Marusik ........................ 323/273 |
| 6,462,434 | B1 | * | 10/2002 | Winick et al. .................... 307/85 |
| 6,507,129 | B2 | * | 1/2003 | Buchanan ........................ 307/51 |
| 6,522,190 | B1 | * | 2/2003 | Malik et al. .................... 327/408 |
| 6,600,239 | B2 | * | 7/2003 | Winick et al. .................... 307/85 |
| 7,038,522 | B2 | * | 5/2006 | Fauh et al. .................... 327/407 |
| 7,379,282 | B1 | * | 5/2008 | Zansky ........................... 361/82 |
| 2002/0113494 | A1 | | 8/2002 | Winick et al. |
| 2002/0125865 | A1 | | 9/2002 | Buchanan |
| 2002/0135235 | A1 | | 9/2002 | Winick et al. |

FOREIGN PATENT DOCUMENTS

| | | |
|---|---|---|
| DE | 102 12 164 A1 | 10/2002 |
| EP | 1 253 704 A2 | 10/2002 |

OTHER PUBLICATIONS

Shi F et al: "Integrated power systems with fault tolerant attributes", Applied Power Electronics Conference and Exposition, 1997, vol. 1, Feb. 23, 1997 XP010215855, pp. 443-447.

German Office Action with English translation dated Jun. 20, 2007 (Seven (7) pages).

German Office Action with English translation dated Mar. 14, 2008 (Seven (7) pages).

* cited by examiner

REDUNDANT CURRENT SUPPLY WITH DIAGNOSTIC CAPABILITY AND A SUPPRESSOR

CROSS-REFERENCE TO RELATED APPLICATIONS

This application is a continuation of PCT International Application No. PCT/EP2007/007445, filed Aug. 24, 2007, which claims priority under 35 U.S.C. §119 to German Patent Application No. DE 10 2006 040 753.9, filed Aug. 31, 2006, the entire disclosures of which are herein expressly incorporated by reference.

BACKGROUND AND SUMMARY OF THE INVENTION

The invention concerns safety-relevant systems in motor vehicles and relates, in particular, to a redundant current supply having a diagnostic capability and a suppressor for improving the availability of such safety-relevant systems.

Important and/or safety-relevant systems in the motor vehicle sector, for example electronic braking systems or gear shifting systems in the area of passenger vehicles and utility vehicles, have to be provided with maximum availability in order to be able to ensure an emergency running capability of a motor vehicle, for instance, in the event of a failure or some other fault situation.

Therefore, in the case of such systems, inter alia for the current supply thereof, a redundancy is required in such a way that the current supply is routed via at least two separate paths, which are independent of one another, and, in the event of a failure of one path, an uninterrupted supply of an electronic control unit is ensured and an identification and an indication of this failure are possible.

In the case of known arrangements, this is achieved by decoupling the two paths via lines that can be switched over, by use of relay contacts, diodes and transistors, for example.

In the case of a decoupling of this type, however, a power loss occurs at the involved diode elements, which power loss is determined by the forward voltage of the diode and the load current flowing through the diode. Moreover, there is the possibility that after a changeover operation, the entire load current immediately flows through the still intact current path and is no longer divided—ideally in the ratio 1:1—between the at least two equivalent current supply branches present. This can lead to the occurrence of great peak powers in the diodes and consequently to a destruction of the diodes.

Particularly in the case of systems having a high current consumption, such as transmission controllers, for example, and/or high operating temperatures, therefore, the power losses that occur in semiconductor switching elements used for decoupling have to be minimized in order not to exceed the maximum permissible operating temperature of the semiconductor switching elements and, as a result, not to reduce the service life thereof.

Therefore, the invention is based on the object of providing a redundant current supply for safety-relevant systems in motor vehicles, which minimizes power losses occurring in semiconductor switching elements and limits the peak powers occurring therein.

According to the invention, a circuit arrangement for the redundant current supply of a load connected downstream is provided, the circuit arrangement including:

at least one first current path comprising a first switching element at which a first voltage is present on the input side;

at least one second current path comprising a second switching element at which a second input voltage is present on the input side;

at least one first control device, which is connected to the first current path and serves for controlling the first switching element;

at least one second control device, which is connected to the second current path and serves for controlling the second switching element; and a common output terminal of the first and second current paths, at which a load supply voltage is output; wherein in a normal operating state, the first control device holds the first switching element in a conducting state and the second control device holds the second switching element in a conducting state, and further wherein in an abnormal operating state, depending on electrical properties of the first current path or of the second current path, one of the control devices which is situated in the current path having poorer electrical properties brings the switching element in this current path into a blocking state.

Preferably, the first and the second switching elements are power semiconductors, in this case advantageously a normally "off" n-MOSFET.

Particularly preferably, the first and the second control device, in each case, is constructed from identical and identically interconnected elements, is arranged in parallel with the first and the second switching elements, respectively, has a first input for putting and holding the first and the second switching elements, respectively, into/in the "on" state by means of a control unit, has a second input for detecting a current generated by the first and second switching elements, respectively, has a first output for controlling the switching state of the first and the second switching elements, respectively, depending on the current detected at the second input, and has a second output for the feedback of the switching state of the first and second switching elements, respectively, to the control unit and detection of the switching state by means of the latter.

The control by a microcontroller of an electronic control unit of the vehicle is advantageous in this case.

Particularly advantageously, the first and second current paths are decoupled by an internal diode, operated in the reverse direction, respectively of the first and the second switching elements.

Preferably, the electrical properties are the voltage at the first and the second current path and the internal resistance of the first and of the second current path, the poorer electrical properties are a higher internal resistance or a lower voltage, and the switching element in the lower-resistance current path is controlled to the conducting state and the switching element in the higher-resistance current path is controlled into the blocking state.

In this case, advantageously, a changeover to the lower-resistance current path is effected automatically and in a self-controlled fashion, and a changeover to the lowest-resistance current path is effected depending on the number of current paths present.

A method is also provided for the redundant current supply of a load connected downstream in a circuit arrangement, including at least one first current path including a first switching element at which a first voltage is present on the input side, at least one second current path including a second switching element at which a second input voltage is present on the input side, at least one first control device which is connected to the first current path and serves for controlling the first switching element, at least one second control device which is connected to the second current path and serves for controlling the second switching element, and a common output terminal of the first and second current paths, at which a load supply voltage is output. The method is characterized by the steps of:

(a) in a normal operating state, holding the first switching element in a conducting state by way of the first control device and holding the second switching element in a conducting state by way of the second control device, and (b) in an abnormal operating state, depending on electrical properties of the first current path or of the second current path, switching the switching element which is situated in a current path having poorer electrical properties into a blocking state by way of that one of the control devices which is situated in this current path.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
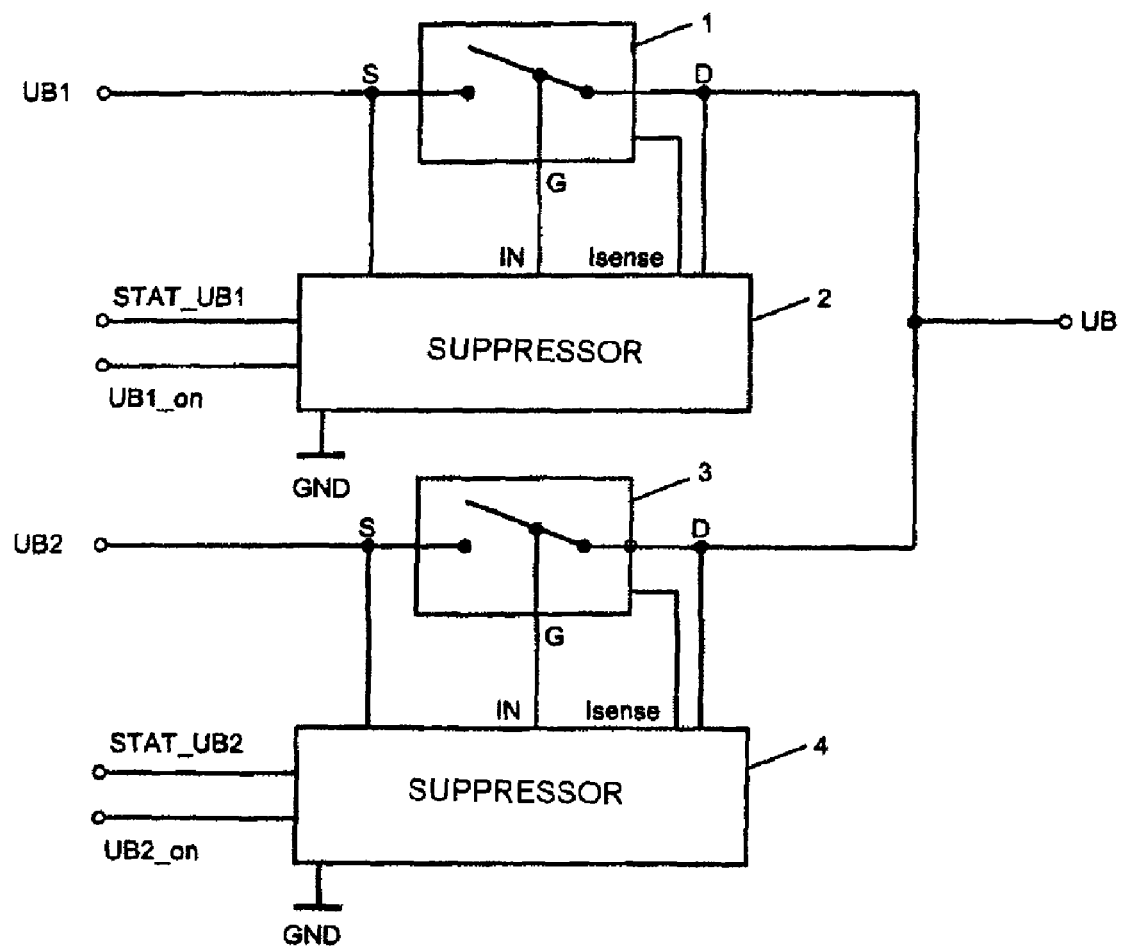
FIG. 1 is a simplified block diagram of a current supply with current monitoring and turn-off in accordance with one preferred exemplary embodiment of a redundant current supply with diagnostic capability and a suppressor.

FIG. 1 shows a simplified block diagram of a current supply with current monitoring and turn-off in accordance with one preferred exemplary embodiment of a redundant current supply with diagnostic capability and a suppressor.

In detail, FIG. 1 illustrates a first, upper current branch or current path including an input line at the potential of a battery voltage UB1, a switching element 1 in the input line, and a suppressor 2 coupled in parallel with the input line, a second, lower current branch including an input line at the potential of a battery voltage UB2, a switching element 3 in the input line, and a suppressor 4 coupled in parallel with the input line, as well as a common output line at the potential of a battery voltage UB as a supply voltage for an electronic control unit (not shown) connected downstream.

The switching elements 1 and 3 are, preferably, semiconductor switching elements (power semiconductors).

The suppressors 2 and 4 each have a first input, which is connected to a source terminal (S) of the switching elements 1 and 3, respectively, a second input, which is connected to a drain terminal (D) of the switching elements 1 and 3, respectively, a third input (Isense) for detecting a current generated in the switching elements 1 and 3, respectively, a fourth input, which serves as a switching signal input for switching signals (UB1_on, UB2_on) having two logic states or signal levels 0 and 1, an output (IN), which serves as a switching-controlling input for the switching elements 1 and 3, respectively, a second output (STAT_UB1, STAT_UB2), at which a feedback signal having two logic states or signal levels 0 and 1 is output, and a terminal at ground potential (GND).

Figure 2:
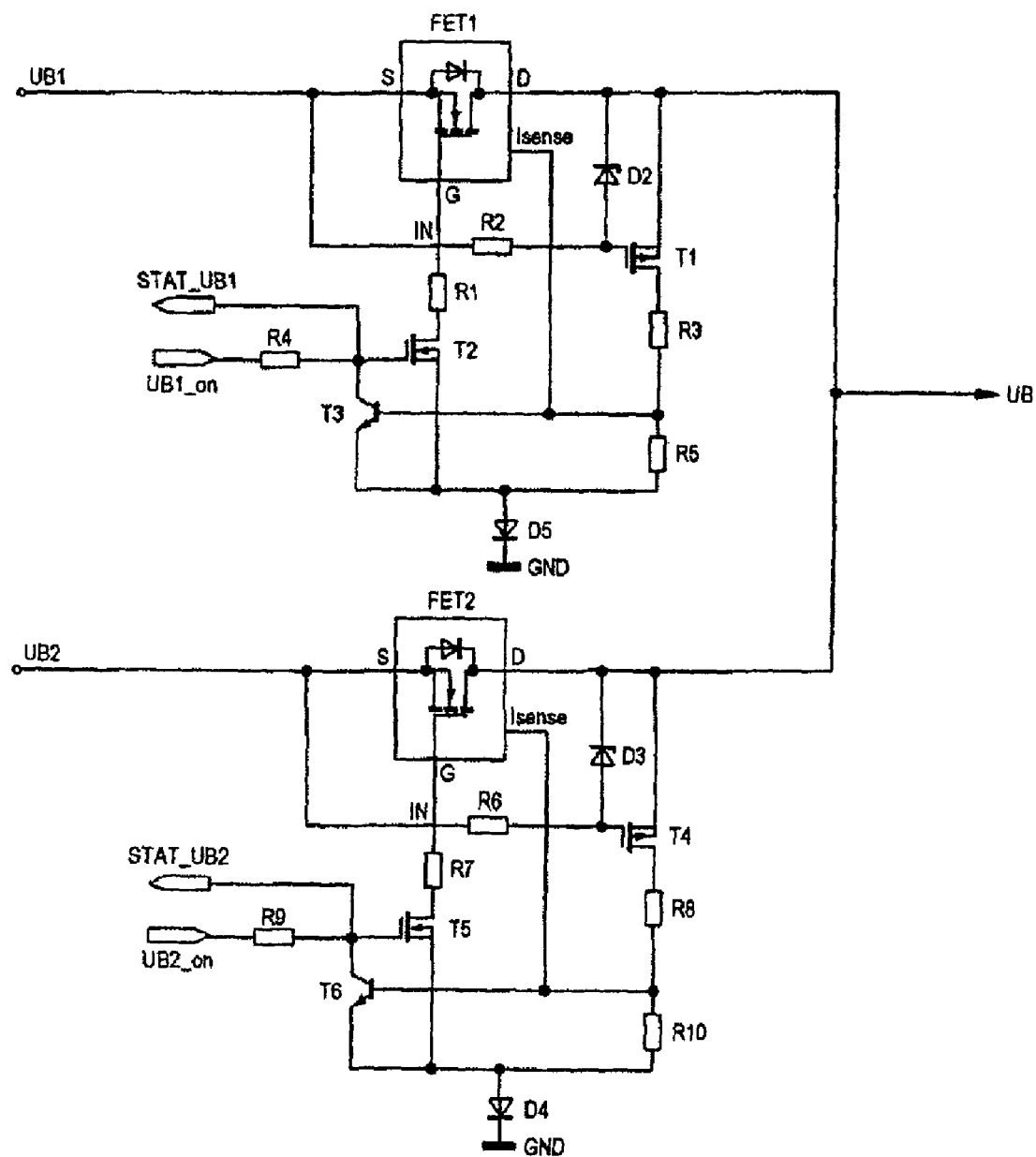
FIG. 2 is a basic circuit arrangement of the redundant current supply in accordance with FIG. 1.

FIG. 2 shows in detail a basic circuit arrangement of the redundant current supply in accordance with FIG. 1.

FIG. 2 illustrates two identically constructed current supply branches at which respectively input voltages (battery voltages) UB1 for the first, upper branch and UB2 for the second, lower branch are present and corresponding input currents are fed in via input or supply lines. The supply voltage UB (battery voltage) is output at a common output of the two branches. The supply voltage is fed to a device (not shown) to be supplied that is connected downstream, for example an electronic control unit or an actuator.

The circuit arrangement of the first, upper current supply branch is described in detail below.

The first, upper current supply branch essentially includes a field effect transistor FET1 serving as a switching element, for example a normally off n-MOSFET having a source terminal S, a drain terminal D, a gate terminal G (IN) and an output terminal Isense, a zener diode D2, a diode D5, a field effect transistor T1, for example a normally off p-MOSFET, a field effect transistor T2, for example a normally off n-MOSFET, a bipolar transistor T3, for example an npn transistor in common emitter connection, resistors R1, R2, R3, R4 and R5, a signal output STAT_UB1, and a signal input UB1_on.

In the upper current supply branch, the source terminal S of the field effect transistor FET1 is connected to the line carrying the battery voltage UB1 and supplies at its drain terminal D the battery voltage UB for the device to be supplied that is connected downstream. The resistor R2 is connected to the source terminal S of the field effect transistor FET1 at one of its ends and to the gate terminal G of the field effect transistor T1 and the anode of the zener diode D2 at the other of its ends. The cathode of the zener diode D2 is connected to the drain terminal D of the field effect transistor FET1, wherein the zener diode D2 is reverse biased between the drain terminal D of field effect transistor FET1 and the resistor R2. The source terminal S of the field effect transistor T1 is connected to the drain terminal D of the field effect transistor FET1, and the drain terminal D of the field effect transistor T1 is connected to one end of the resistor R3, the other end of which is in turn connected to the resistor R5 and is simultaneously led to the base terminal of the bipolar transistor T3. The other end of the resistor R5 is connected to the emitter of the bipolar transistor T3 and one end of the diode D5, which is therefore likewise connected to the emitter of the bipolar transistor T3 and, moreover, is arranged in a forward direction toward a ground (GND) of the motor vehicle. The collector terminal of the bipolar transistor T3 is connected to one end of the resistor R4, at the other end of which a switch-on signal UB1_on is fed in, and the gate terminal G of the field effect transistor T2 and is furthermore led to the signal output STAT_UB1. The source terminal S of the field effect transistor T2 is connected to the emitter of the bipolar transistor T3, the diode D5 and the resistor R5. The drain terminal D of the field effect transistor T2 is led via the resistor R1 to the gate terminal G (IN) of the field effect transistor FET1. An output terminal (output pin) Isense of the field effect transistor FET1 finally leads to the base terminal of the bipolar transistor T3 and between the resistors R3 and R5.

The second, lower current branch, which is constructed identically with regard to its elements, essentially includes a field effect transistor FET2 serving as a switching element, for example a normally off n-MOSFET having a source terminal S, a drain terminal D, a gate terminal G (IN) and a terminal Isense, a zener diode D3, a diode D4, a field effect transistor T4, for example a normally off p-MOSFET, a field effect transistor T5, for example a normally off n-MOSFET, a bipolar transistor T6, for example an npn transistor in common emitter connection, resistors R6, R7, R8, R9 and R10, a signal output STAT_UB2, and a signal input UB2_on.

As can be gathered from FIG. 2, the individual elements of the second, lower current branch correspond to those of the first, upper current branch in terms of their type, arrangement and function. Thus, their fundamental interconnections will not be described again.

It is noted that bipolar transistors can also be used for the transistors T1, T2, T4 and T5, n-MOSFETs can also be used for the transistors T3 and T6, and p-MOSFETs can also be used for the field effect transistors FET1 and FET2.

The functioning of the entire circuit arrangement including the upper and the lower current branch for the changeover of the battery voltages UB1, UB2 and thus the current supply for the device connected downstream between these two branches will now be described below.

First, the current supply of the circuit arrangement is effected via the two input lines UB1 (upper branch) and UB2 (lower branch).

The two field effect transistors FET1 and FET2, which can be integrated, for example, and form semiconductor switches for switching the input voltages UB1 and UB2, are arranged inversely with respect to their actual installation direction, such that even in a state in which the field effect transistors FET1 and FET2 are not switched on or in, their internal inverse diodes illustrated in FIG. 2 are conducting and permit the supply voltage UB through both the input voltage UB1 and the input voltage UB2. At the same time, in this state, the two input voltages UB1 and UB2 are decoupled from one another since, in a fault situation, a short circuit from either the input voltage UB1 or the input voltage UB2 to ground (GND) does not affect the respective other, still intact supply line.

If the two field effect transistors FET1 and FET2 are turned on via the input UB1_on, the resistor R4, the field effect transistor T2 and the resistor R1 and, respectively, the input UB2_on, the resistor R9, the field effect transistor T5 and the resistor R7 by means of an input signal having a signal level of UB1_on=logic 1 and UB2_on=logic 1, and if the two transistors T3 and T6 are turned off, the internal inverse diodes of the field effect transistors FET1 and FET2 are bridged by the internally parallel-connected drain-source on resistances RDSon1, RDSon2 (not shown) of the field effect transistors FET1 and FET2, such that, in the case of a current flowing from the supply lines UB1 and UB2 to the common output UB in accordance with $$P_{Fet}=I_L^2 \times R_{Dson} \qquad (1),$$

only power losses through the on resistances RDSon1, RDSon2 of the field effect transistors FET1 and FET2 arise. In this case, when both supply lines UB1 and UB2 have identical data with regard to the supply line and contact transition resistances, for example, and, consequently, the two input voltages UB1 and UB2 at respective terminals of the electronic unit are also exactly identical, the same proportional current flows via the first, upper current branch and the second, lower current branch.

This is explained in more detail below on the basis of an example.

It should be assumed that the input UB1 is a terminal having a higher voltage or a lower internal resistance, and the input UB2 is a terminal having a lower voltage or a higher internal resistance.

In this case, since the terminal UB2 has differences relative to the terminal UB1 on account of, for example, higher-resistance supply lines or contact transition resistances, an exactly identical division, ideally a 1:1 division, of the total current flowing via the two inputs UB1 and UB2 to the output UB is no longer ensured.

Therefore, a part of the current flowing via the input UB1 having the higher voltage and the lower internal resistance and the field effect transistor FET1 into the load, that is to say for example the electronic control unit as the unit to be supplied that is connected downstream, flows via the field effect transistor FET2 of the other, "poorer" input UB2 out of the load again and brings about a type of charging of the poorer input UB2, such that a high shunt current flow through the two field effect transistors FET1 and FET2 can occur in an undesirable manner.

In the abovementioned example, the current flowing via the input UB1 to the output UB into the load generates, at the field effect transistor FET1, a voltage of $$U1=RDSon1 \times IL \qquad (2),$$

which generates a positive voltage at the source terminal S of the field effect transistor FET1 with respect to the drain terminal D thereof and turns off the transistor T1 by way of the positive voltage. In this case, the current output at the terminal Isense of the field effect transistor FET1 is zero, since the internal current source of field effect transistor FET1 supplies current only for the case of a current flow from drain to source.

If a part of this current then flows via the terminal UB2 out of the load again, a positive voltage arises between the drain terminal D and the source terminal S of the field effect transistor FET2, that is to say that the source potential is negative with respect to the drain potential, and the internal current source Isense of the field effect transistor FET2 supplies a current.

Consequently, a positive current flows to ground (GND) via the terminal Isense of the field effect transistor FET2 and the resistor R10, which current generates a corresponding voltage drop at the resistor R10. If this voltage drop at the resistor R10 becomes greater than the base emitter voltage of the transistor T6, transistor T6 is turned on and effects limiting regulation of the field effect transistor FET2 via the gate terminal of the field effect transistor T5. T2 and T5 can also be bipolar transistors.

FET2 is thereby turned off, whereby the voltage at the input UB2 drops further again. The on resistance RDSon2 of the field effect transistor FET2 is increased, that is to say that the current distribution between the first, upper current branch and the second, lower current branch changes further in favor of a higher current through the upper current branch. If the drain-source voltage at the field effect transistor FET2 then becomes higher than the threshold voltage of the normally off (field effect) transistor T4, the latter is turned on and brings about an additional positive feedback of the voltage via the resistor R10 and the bipolar resistor T6.

Finally, via the field effect transistor T5, the bipolar transistor T6 turns the field effect transistor FET2 completely off, such that a current no longer flows away via the field effect transistor FET2, but rather only flows from the input UB1 to the output UB, that is to say exclusively via the first, upper current branch of the circuit arrangement.

In this state, since the (bipolar) transistor T6 is turned on, the turned-off state of the field effect transistor FET2 can be detected by a driving microprocessor of the electronic control unit by way of a feedback at the terminal STAT_UB2. In detail, the microprocessor in this case drives the input UB2_on with a signal level of logic 1 and, on account of the on state of the bipolar transistor T6, detects a signal level of logic 0 at the output STAT_UB2, whereas STAT_UB2 would be logic 1 in the fault-free state.

On account of the identical construction of the circuit arrangement in the upper and the lower current branch, it is readily evident that in the case of inverse voltage relations at the inputs UB1 and UB2, that is to say when the input UB2 is a terminal having a higher voltage or a lower internal resistance and the input UB1 is a terminal having a lower voltage or a higher internal resistance, the result is a corresponding operating sequence with turn-off of the field effect transistor FET1 and a flow of the entire current from the input UB2 via the field effect transistor FET2 to the output UB.

Fault situations such as, for example, a short circuit of one of the lines UB1 or UB2 to ground lead to an immediate switch-off of the corresponding switch in the fault branch as a result of corresponding voltage relations across the field effect transistors involved, as described above.

The adaptation of the turn-off thresholds is possible by the dimensioning of the circuit. In the case of exactly identical relations, it is also possible for both current paths, via the field effect transistors FET1 and FET2, to be current-carrying to identical portions.

It is noted that no influencing of the intact branch or path occurs in this case on account of the decoupling of the fault branch via the internal diode, operated in the reverse direction, of the field effect transistor.

Furthermore, it is possible to obtain a redundancy of the same type in the ground leads according to the same principle as described above. A ground offset or voltage offset of the electronic ground potential that is caused by occurring voltage drops and/or diode paths should be taken into account in the case of a configuration of the principle with regard to the ground leads. Problems can thereby result in the case of interfaces (e.g. CAN) inter aha. Furthermore, it should be taken into consideration in this case that in motor vehicles usually only the supply lines carrying the positive voltage UB (+Ubatt), but not ground lines present, are safeguarded by means of fusible links.

The solution proposed thus leads to the following advantages:

(1) A plurality of current supply branches are effectively decoupled.

(2) A minimum power loss arises in the power semiconductors owing to the use of low-resistance semiconductor switches (MOSFETs) as switching or decoupling elements.

(3) A possibly integrated self-protection of the semiconductors takes effect at an excessively high operating temperature.

(4) A current limiting function is realized.

(5) A current flow in a direction not intended, that is to say a back current out of the electronic control unit, is identified and the semiconductor switch affected is automatically turned off.

(6) The circuit arrangement and its function can be tested and diagnosed at any time in order to ensure availability.

(7) Fault situations are automatically identified. The current branch in which the fault was identified is turned off automatically and without an additional control device such as, for example, a microcontroller with additional intelligence; an automatic changeover to the available current branch with the lowest resistance is thus effected.

(8) The functionality of the circuit arrangement is obtained with a smallest possible outlay on components and hence cost-effectively.

| Table of Reference Symbols | |
|---|---|
| 1, 2: | Switching element |
| 3, 4: | Control device |
| FET1, FET2: | Normally off n-MOSFET (power semiconductor) |
| D2, D3: | Zener diode |
| D4, D5: | Diode |
| T1, T4: | Normally off p-MOSFET |
| T2, T5: | Normally off n-MOSFET |

| Table of Reference Symbols | |
|---|---|
| T3, T6: | Bipolar transistor |
| R1-R10: | Resistor |
| GND: | Ground potential |
| UB1, UB2: | Battery voltage, input |
| UB: | Battery voltage, output |
| STAT_UB1, STAT_UB2: | Output for feedback |
| UB1_on, UB2_on: | Input for switching signal |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A circuit arrangement for a redundant current supply of a load connected downstream, the circuit arrangement comprising:

at least one first current path comprising a first switching element at which a first voltage is present on an input side;

at least one second current path comprising a second switching element at which a second voltage is present on an input side;

at least one first control device, which is connected to the first current path and serves for controlling the first switching element;

at least one second control device, which is connected to the second current path and serves for controlling the second switching element; and a common output terminal of the first and second current paths, at which a load supply voltage is output; wherein:

in a normal operating state, the first control device holds the first switching element in a conducting state and the second control device holds the second switching element in a conducting state; and in an abnormal operating state, depending on electrical properties of the first current path or of the second current path, a respective control device which is situated in the current path having poorer electrical properties switches its respective switching element in said current path into a blocking state;

wherein the first and the second control devices, in each case:

(a) are constructed from identical and identically interconnected elements;

(b) are arranged in parallel with the respective one of the first and the second switching elements;

(c) have a first input connected to a control unit for putting and holding the respective one of the first and second switching elements into/in an on state by way of a switching signal from the control unit;

(d) have a second input connected to a current terminal of the respective one of the first and the second switching elements, said current terminal being different from the respective first and second current paths comprising the respective first and second switching elements and supplying current from an internal current source of the switching element to the control device, for detecting a current generated by the respective one of the first and second switching elements;

(e) have a first output for controlling the switching state of the respective one of the first and second switching elements, depending on the current detected at the second input; and (f) have a second output for the feedback of the switching state of the respective one of the first and second switching elements to the control unit and detection of the switching state by way of the control unit.

2. The circuit arrangement as claimed in claim 1, wherein the first and second switching elements are power semiconductors.

3. The circuit arrangement as claimed in claim 2, wherein the first and second switching elements are normally off MOSFETs.

4. The circuit arrangement as claimed in claim 1, wherein the control unit is a microcontroller of an electronic control unit of a vehicle.

5. The circuit arrangement as claimed in claim 1, wherein the first and second current paths are decoupled by an internal diode, operated in a reverse direction, respectively of the first and the second switching elements.

6. The circuit arrangement as claimed in claim 1, wherein the electrical properties are a voltage at, or an internal resistance of, the first and of the second current path, and the poorer electrical properties are a higher internal resistance or a lower voltage; and further wherein the switching element in the lower-resistance current path is controlled to a conducting state and the switching element in the higher-resistance current path is controlled into the blocking state.

7. The circuit arrangement as claimed in claim 6, wherein a changeover to the lower-resistance current path is effected automatically and in self-controlled fashion.

8. The circuit arrangement as claimed in claim 7, wherein a changeover to the lowest-resistance current path is effected depending on a number of current paths present.

9. A method for redundantly supplying current to a load connected downstream in a circuit arrangement comprising at least one first current path comprising a first switching element at which a first voltage is present on an input side, at least one second current path comprising a second switching element at which a second voltage is present on an input side, at least one first control device, which is connected to the first current path and serves for controlling the first switching element, at least one second control device, which is connected to the second current path and serves for controlling the second switching element, and a common output terminal of the first and second current paths, at which a load supply voltage is output, the method comprising the acts of:

in a normal operating state, holding the first switching element in a conducting state by way of the first control device and holding the second switching element in a conducting state by way of the second control device; and in an abnormal operating state, depending on electrical properties of the first current path or of the second current path, switching the switching element which is situated in a current path having poorer electrical properties into a blocking state by way of the respective one of the control devices which is situated in said current path having the poorer electrical properties;

and by means of the first and second control device, in each case:

(a) putting and holding the respective one of the first and second switching elements into/in an on state by way of a switching signal supplied from a control unit connected to the control device via a first input of the control device, (b) detecting a current generated by the respective one of the first and second switching elements via a second input connected to a current terminal of the respective one of the first and the second switching elements, said current terminal being different from the respective first and second current paths comprising the respective first and second switching elements and supplying current from an internal current source of the switching element to the control device;

(c) controlling the switching state of the respective one of the first and second switching elements, depending on the current detected at the second input; and (d) feeding back the switching state of the respective one of the first and second switching elements to the control unit and detecting the switching state by way of the control unit.

10. The method as claimed in claim 9, wherein the electrical properties are a voltage at, or an internal resistance of, the first and of the second current path, and the poorer electrical properties are a higher internal resistance or a lower voltage, and further wherein the switching element in the lower-resistance current path is controlled into a conducting state and the switching element in the higher-resistance current path is controlled into the blocking state.

11. The method as claimed in claim 9, wherein the electrical properties are a voltage at, or an internal resistance of, the first and of the second current path, and the poorer electrical properties are a higher internal resistance or a lower voltage, and further wherein the switching element in the lower-resistance current path is controlled into a conducting state and the switching element in the higher-resistance current path is controlled into the blocking state.

12. The method as claimed in claim 11, wherein a changeover to the lower-resistance current path is effected automatically and in self-controlled fashion.

13. The method as claimed in claim 12, wherein a changeover to the lowest-resistance current path is effected depending on the number of current paths present.

14. The method as claimed in claim 9, wherein each of the first and second current paths are decoupleable, respectively, via an internal diode, operated in a reverse direction, of the respective first and second switching elements.

* * * * *